US007007982B2

(12) United States Patent
Ishii et al.

(10) Patent No.: US 7,007,982 B2
(45) Date of Patent: Mar. 7, 2006

(54) TUBE FITTING

(76) Inventors: Hidesaburo Ishii, 10-2, Minamiyukigaya 3-chome, Ota-ku, Tokyo (JP); Kazuo Yano, 28-4, Higashiyukigaya 5-chome, Ota-ku, Tokyo (JP)

( * ) Notice: Subject to any disclaimer, the term of this patent is extended or adjusted under 35 U.S.C. 154(b) by 0 days.

(21) Appl. No.: 10/425,086

(22) Filed: Apr. 28, 2003

(65) Prior Publication Data

US 2003/0205900 A1    Nov. 6, 2003

(30) Foreign Application Priority Data

| May 1, 2002 | (JP) | ............................. 2002-129620 |
| Sep. 20, 2002 | (JP) | ............................. 2002-274785 |

(51) Int. Cl.
*F16L 27/10* (2006.01)

(52) U.S. Cl. .................. 285/223; 285/148.13; 285/422
(58) Field of Classification Search .................. 285/32, 285/294.1, 293.1, 48, 417, 49, 422, 50, 119, 285/54, 53, 148.1, 148.3, 148.9, 148.11, 148.12, 285/235, 237, 285.1, 290.1–290.5, 226, 223, 285/148.13, 148.16, 148.17
See application file for complete search history.

(56) References Cited

U.S. PATENT DOCUMENTS

| 704,425 | A | * | 7/1902 | Allen | ........................... 285/53 |
| 1,767,612 | A | * | 6/1930 | Pieper | .......................... 285/54 |
| 2,885,224 | A | * | 5/1959 | Campbell et al. | ............. 285/48 |
| 3,936,078 | A | * | 2/1976 | Wallyn | ........................ 285/49 |
| 4,093,280 | A | * | 6/1978 | Yoshizawa et al. | ......... 285/328 |
| 4,462,421 | A | * | 7/1984 | Ross et al. | .................... 285/53 |
| 5,284,367 | A | * | 2/1994 | Yano | .......................... 285/226 |

FOREIGN PATENT DOCUMENTS

| GB | 536846 | * 5/1941 | .................. 285/53 |
| JP | 8277985 | 10/1996 | |
| JP | 9068293 | 3/1997 | |
| JP | 9096384 | 4/1997 | |
| JP | 9184588 | 7/1997 | |

* cited by examiner

Primary Examiner—Aaron Dunwoody
(74) Attorney, Agent, or Firm—Quarles & Brady LLP

(57) ABSTRACT

A tube fitting capable of absorbing vibration and shock resulting from a high pressure fluid passing through the tube fitting while it is used includes a connection head, a connection nipple, and an intermediate connection member. The connection head and the connection nipple are provided with an annular collar projecting from an end surface of the connection head and the connection nipple. The connection head, the connection nipple and the intermediate connection member are joined by inserting the annular collars into both ends of the intermediate connection member.

8 Claims, 13 Drawing Sheets

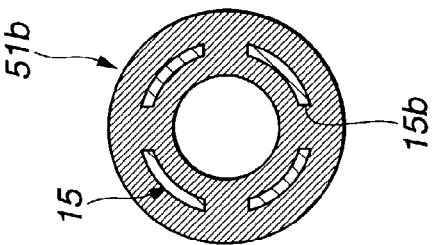
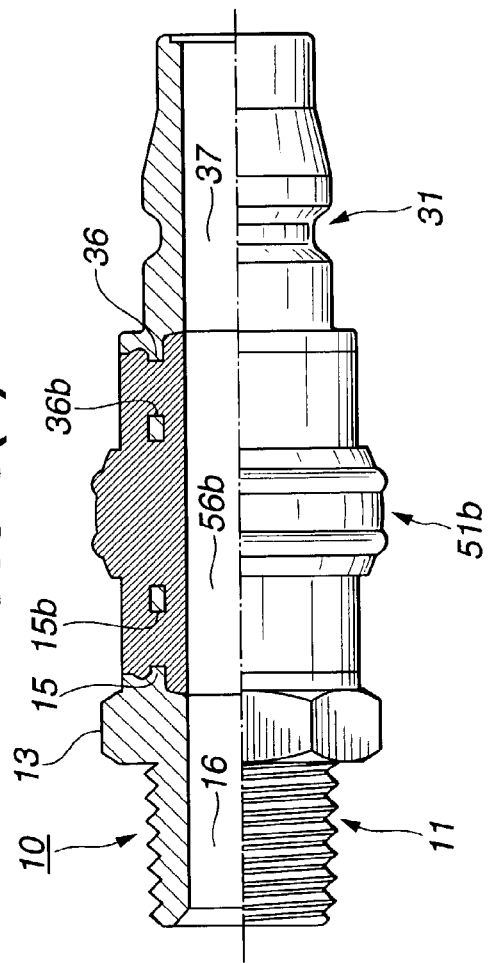
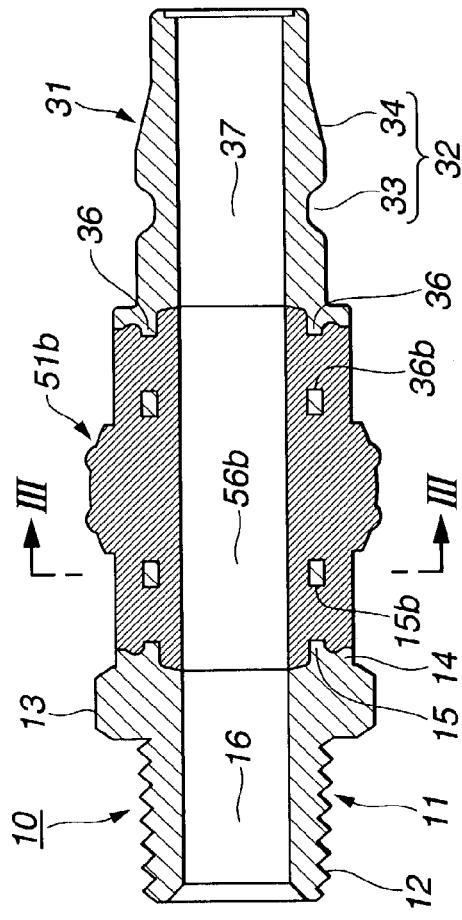

51b

51b

TUBE FITTING

CROSS REFERENCES TO RELATED APPLICATIONS

Not Applicable

STATEMENT REGARDING FEDERALLY SPONSORED RESEARCH

Not Applicable

BACKGROUND OF THE INVENTION

The present invention relates to a tube fitting having an air inlet at one end and an air outlet at other end adapted for use in connecting an air tool to the air outlet and a tube or pipe to the air inlet for supplying pressurized air to the air tool. More particularly, the present invention relates to a tube fitting for effectively absorbing a vibration and shock transmitted to the pipe fitting during use.

In various manual air tools actuated by pressurized air, a tube fitting is used at an air inlet or outlet portion of the air tool, or an intermediate portion of the pressurized air path. The tube fitting is connected to an air source by means of a pressure-resistant and flexible hose or tube to be inserted into the connection end of the tube fitting for permitting the predetermined pressurized air to flow therethrough. In addition, the tube fitting is required to tighten and hold the tube to be connected at the inserted position to maintain the firm connection. There is also known a tube fitting which is able to disconnect from the tube by releasing a coupling, while keeping the connection between the tube fitting and the air tool. As an example of this type of tube fitting, there have been conventionally proposed and used a plug-in quick tube coupler which enables to connect and disconnect the tube fitting to and from the pressurized fluid supply line. The quick tube coupler is disclosed in Japanese Patent Application Laid-Open Publication Nos. 8-277985, 9-68293, 9-96384, or 9-184588.

The quick tube coupler is used for relatively high pressurized air to actuate the air tool. Accordingly, it is necessary for the tube constituting a flow path for the pressurized air and the tube fitting arranged at various positions of the fluid flow path to provide appropriate pressure resistance in consideration for safety. The connecting tube tends to increase inflexibility during use due to the pressure resistant structure of the tube and a pressure applied from the pressurized air flowing therethrough. Since a manual pneumatic device, such as a manual air tool, is used to be carried to positions by hand where it is used, the connecting tube is required to have such flexibility so as to be able to quickly and reliably follow the hand carrying action of the air tool.

When the tube fitting is supplied with pressurized air, the air supplying side of the tube fitting is subjected to continuously transmitted vibration and shock due to pressurization from the air compression source. In addition, the transmitted vibration and shock propagate to the hand operated air tool via the connecting tube. On the other hand, counter vibrations and shocks due to air pressure discharged from the air tool during the operation or air exhaust from the air tool are transmitted to the air compression source via the tube fitting and the connecting tube. Thus, there has been a possibility of causing various unfavorable effects not only to the tube fitting, but also to the air compression source, the hand operated air tool, and workers.

It is possible to solve effects based on vibration and shock during the use of the tube fitting by providing a vibration absorbing mechanism or vibration buffering mechanism in the flow path of the pressurized air. If such a vibration absorbing mechanism or vibration buffering mechanism is independently provided in the flow path, the flow path system itself becomes unnecessarily complicated or complex. Further, various unfavorable problems arise such as degrading the workability, causing a failure, and the like. This is not always effective countermeasure.

BRIEF SUMMARY OF THE INVENTION

The present invention has been made in consideration of the foregoing. It is therefore an object of the present invention to provide a tube fitting capable of absorbing or decreasing vibration or shock transmitted to the tube fitting while it is used.

According to the present invention, there is provided a tube fitting for joining two connected objects. The tube fitting comprises a connection head, a connection nipple, and an intermediate connection member arranged between the connection head and the connection nipple to connect the connection head and the connection nipple. The connection head includes a thread portion adapted for thread connection to an object to be connected at one end, an annular collar projecting from a surface of other end, and an axial flow passage. The connection nipple includes a connection portion adapted for plug-in connection to a pressurized fluid source at one end, an annular collar projecting from a surface of other end, and a flow passage. The intermediate connection member includes a third axial flow passage for communicating with the axial flow passages of the connection head and the connection nipple. The intermediate connection member is made of a resin having a predetermined hardness and vibration absorption characteristics and is integrally connected to the connection head and the connection nipple to be held by the annular collars projecting from the end surfaces of the connection head and the connection nipple and inserted into the intermediate connection member.

In accordance with one aspect of the present invention, the intermediate connection members are provided with annular grooves corresponding to each of the annular collars projecting from each end surface of the connection head and the connection nipple on both side ends thereof for permitting the annular collars to press fit into the annular groove so as to sealingly join the connection head, the connection nipple and the intermediate connection member. An adhesive may be used to join the annular collars to the grooves of the connection head and the connection nipple. According to the present invention, the connection head and the connection nipple are made of a metal and the intermediate connection member is preferably made of a resin. The intermediate connection member for coupling the connection head and the connection nipple may be formed by an insert molding. In this instance, it is preferable to form through-holes on the circumference of the annular collars at a predetermined interval.

In addition, each of the annular collars projecting from each end surface of the connection head and connection nipple is provided with a protrusion around the circumferential surface thereof and the intermediate connection member is provided with channels corresponding to each of the protrusions for permitting the protrusion to fit into the channels so as to firmly join the connection head, the connection nipple and the intermediate connection member.

Many variations and modifications of the tube fitting of the present invention are possible. For example, in an alternate form of the present invention, there is provided a tube fitting comprising a connection head, a connection nipple, and an intermediate connection member, wherein the connection head and/or the connection nipple is rotatable.

BRIEF DESCRIPTION OF THE DRAWINGS

The present invention may be carried into practice in various ways and preferred embodiments will now described by way of example with reference to the accompanying drawings, in which:

FIG. 1 schematically shows a basic form of a tube fitting according to a first embodiment of the present invention, wherein

FIG. 2 shows an intermediate connection member used in the tube fitting shown in FIG. 1, wherein

FIG. 3 schematically show a tube fitting according to a modification to the first embodiment of the present invention, wherein FIG. 3A is a partially sectional side view, FIG. 3B is a longitudinal sectional view, and FIG. 3C is a cross sectional view taken along the line III—III of FIG. 3B;

FIG. 5 shows an intermediate connection member extracted from the tube fitting shown in FIG. 3, wherein

FIG. 6 schematically shows a tube fitting according to a second embodiment of the present invention, wherein

FIG. 7 schematically shows a tube fitting according to a third embodiment of the present invention, wherein

FIG. 14 shows a first modification of a connection head of the tube fitting according to the first embodiment of the present invention shown in FIG. 3, wherein

FIG. 15 shows a first modification of a connection head of the tube fitting according to the second embodiment of the present invention shown in FIG. 6, wherein

FIG. 16 shows a first modification of a connection head of the tube fitting according to the third embodiment of the present invention shown in FIG. 7, wherein FIG. 17 shows a plug-in quick tube coupler to be connected and disconnected to and from the tube fitting according to the second embodiment of the present invention shown in FIG. 6, wherein

DETAILED DESCRIPTION OF THE PREFERRED EMBODIMENTS

Figure 1A:
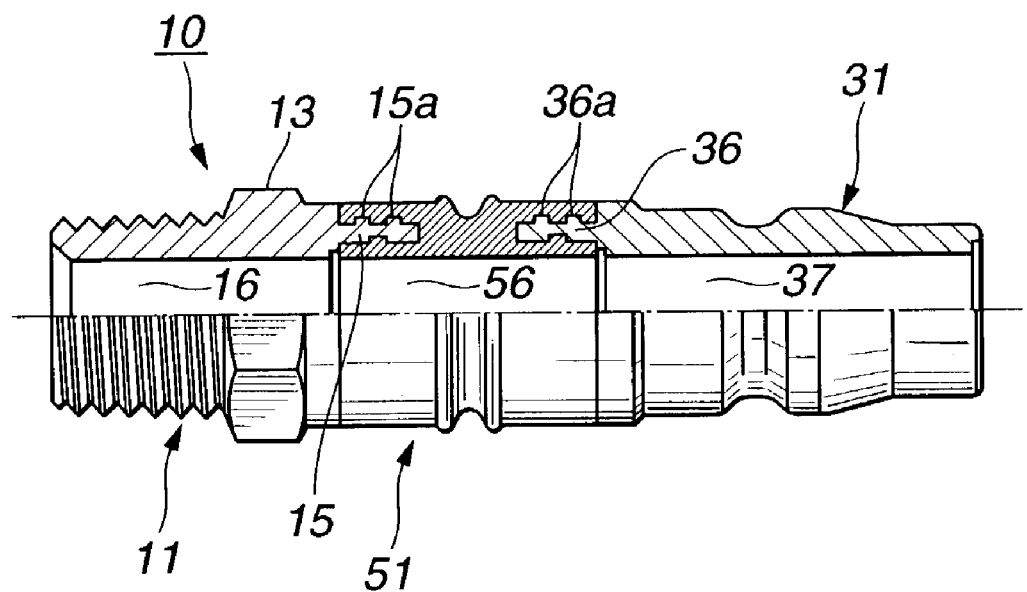
FIG. 1A is a partially sectional side view and FIG. 1B is a longitudinal sectional view.

Several embodiments of a tube fitting according to the present invention will be described in detail with reference to FIGS. 1 through 16. In the figures, the same reference numeral represents the same or equivalent part.

First Embodiment

Figure 1B:
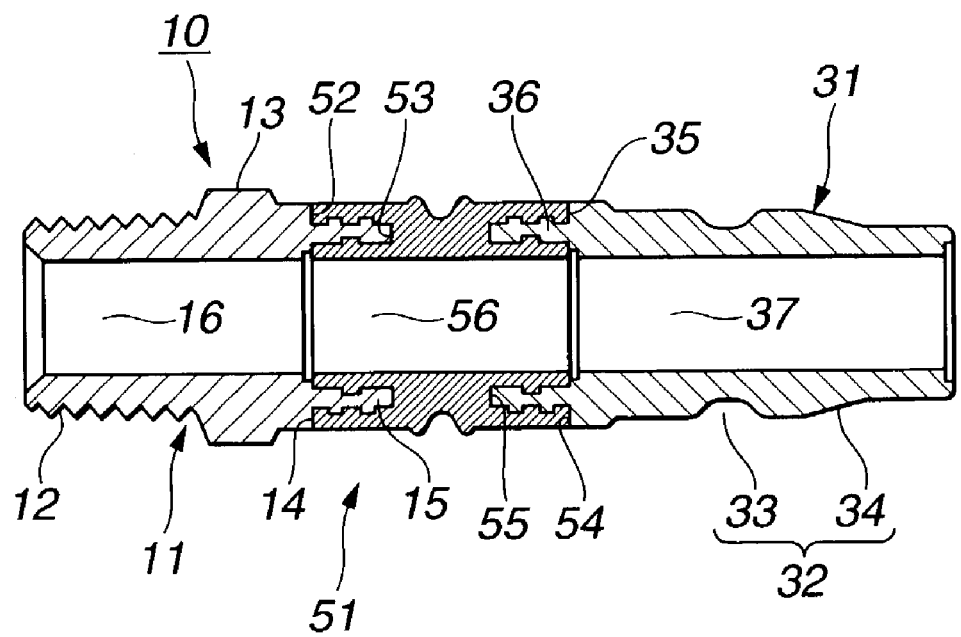
Figure 2A:
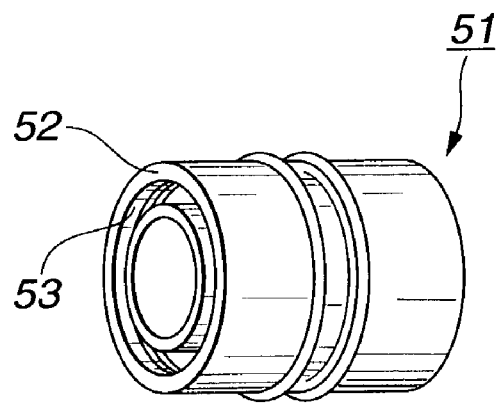
FIG. 2A is a perspective view and FIG. 2B is a longitudinal sectional view.
Figure 2B:
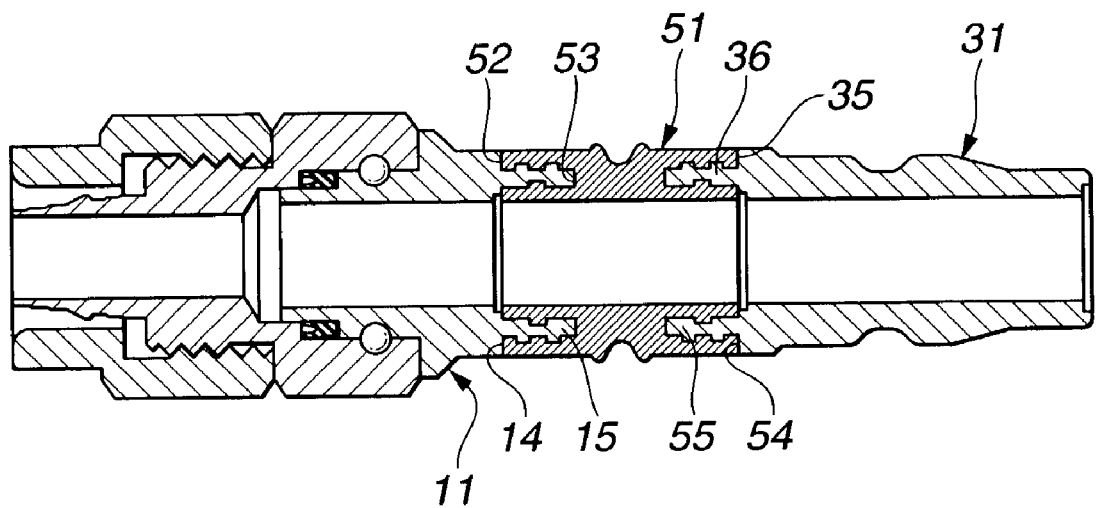

FIG. 1 schematically shows a basic form of a tube fitting according to a first embodiment of the present invention. FIG. 1A is a partially sectional side view, and FIG. 1B is a longitudinal sectional view. FIG. 2 shows an intermediate connection member used in the tube fitting shown in FIG. 1. FIG. 2A is a perspective view, and FIG. 2B is a longitudinal sectional view.

The tube fitting 10 according to the first embodiment of the present invention shown in FIG. 1 comprises a connection head 11, a connection nipple 31, and an intermediate connection member 51.

The connection head 11 is made of a relatively rigid material, such as, for example, resin or metal, preferably metal. On the outer surface of an end of the connection head 11, there are provided a male thread 12 and a hexagonal head 13. The male thread 12 is used to be screwed to a connected object, such as an air tool for supplying pressurized fluid. The hexagonal head 13 is used for a spanner wrench to be engaged for screwing operations. In addition, the connection head 11 is provided with an annular collar 15 having a predetermined length projecting in the axial direction from the end face 14 of the connection head 11. Further, a flow path 16 is axially formed in the tube fitting 10.

Similarly, the connection nipple 31 is made of a relatively rigid material, such as, for example, resin or metal, preferably metal. On one end thereof, there is formed a receptacle section 32 having a connection guide cam face 34 and an anchor groove 33. The receptacle section 32 is used for detachably connecting a tube coupling, for example, a plug-in quick tube coupler 100 shown in FIG. 16 to be described hereinafter. In the same manner as the connection head 11, the connection nipple is provided with an annular collar 36 having a predetermined length projecting in the axial direction from the end face 35 of the connection nipple 31. Further, a flow path 37 is axially formed in the connection nipple 31.

The intermediate connection member 51 is made of a material having a relatively rigid and vibration-absorbing characteristics such as, for example, resin. The connection head 11 and the connection nipple 31 are integrally connected by means of the intermediate connection member 51 arranged between the end faces 14 and 35 and the circular collars 15 and 36. In order to have the intermediate connection member 51 tightly connected to the connection head 11 and the connection nipple 31, the intermediate connection member 51 is provided with end faces 52 and 54 to be abutted against the end faces 14 and 15 of the connection head 11 and the connection nipple 31. An annular groove 53 is provided on the end face 52 so that the annular collar 15 projecting from the end face 14 of the connection head 11 may be fitted into the annular groove 53. Likewise, an annular groove 55 is provided on the end face 54 so that the annular collar 36 projecting from the end face 35 of the connection nipple 31 may be fitted into the annular groove 55. Further, a flow path 56 communicating with the flow paths 16 and 37 of the connection head 11 and the connection nipple 31 is axially formed in the intermediate connection member. The flow path 56 is the same diameter as that of the flow paths 16 and 37.

The annual collars 15 and 36 are provided on the connecting end faces 14 and 35 of the connection head 11 and the connection nipple 31. On both inner and outer peripheries of the annual collars 15 and 36, it is preferable to form a plurality of circumferential protrusions 15a and 36a in order to more effectively ensure integral coupling via the intermediate connection member 51. Moreover, it is also preferable to apply an adhesive to the entire coupling surfaces of the annular collars 15 and 36 to promote the integral coupling of the connection head 11, the intermediate connection member 51 and the connection nipple 31.

The intermediate connection member 51 is made of a synthetic resin, such as, polyurethane, polyester, polyether, and polyvinyl chloride resins capable of providing relatively high rigidity and required vibration absorption characteristics after molding. The intermediate connection member 51 is molded to have a required shape and structure by means of an insert or injection molding through the use of a molding die. The intermediate connection member 51 made of the synthetic resin can provide substantially the same rigidity as that of the connection head 11 and the connection nipple 31. In addition, the intermediate connection member 51 effectively absorbs vibration and shock transmitted to a connected object during use.

The intermediate connection member 51 permits the annular groove 53 to sealingly engage with the annular collar 15 of the thread head 11. The annular groove 55 formed on the intermediate connection member 51 sealingly engages the annular collar 36 of the connection nipple 31. At the same time, the end face 52 of the intermediate connection member 51 is pressed to closely contact to the end face 14 of the head. Similarly, the end face 54 of the intermediate connection member 51 is pressed to closely contact to the end face 36 of the connection nipple. The flow path 56 is communicates with the flow paths 16 and 37. The connection head 11 and the connection nipple 31 of the tube fitting 10 can be firmly and effectively coupled with each other by means of the intermediate connection member 51 by inserting the annular collars 15 and 36 into the annular grooves 53 and 55, respectively. As a result, the tube fitting of the present invention 10 provides intended rigidity and vibration absorption characteristics.

While the connection head 11 and the connection nipple 31 of the tube fitting 10 are integrally coupled with each other by means of the intermediate connection member 51, it is possible to form the intermediate connection member 51 for connecting the connection head 11 and the connection nipple 31 by an insert or injection molding without using the intermediate connection member 51 as a separate and independent unit. In this instance, the connection head 11 and the connection nipple 31 are placed in a molding die so that the end faces 52 and 54 and the corresponding annular collars 15 and 36 are arranged opposite to each other with a predetermined interval. Then, the connection head 11 and the connection nipple 31 are integrally connected by forming the intermediate connection member by means of an inner resin molding injecting the molten resin material in the cavity of the die. It is also effective to use the adhesive when the intermediate connection member 51 is formed by the insert or injection molding.

It is to be understood that the shape of the annular collar 15 and 36 to be contacted to the end faces 14 and 35 is not limited to the configuration of the first embodiment. Any coupling means and structures may be used if it is capable of integral coupling of the connection head, the connection nipple and the intermediate connection member with required rigidity.

Also, according to the first embodiment of the present invention, the connection head 11 is provided with a male thread 12 for coupling the connected object. It is possible to provide the connection head 11 with a female thread on an inner surface of the head if the object to be connected has a male thread.

The tube fitting apparatus 10 according to the first embodiment of the present invention comprises the connection head 11, the connection nipple 31 and the intermediate connection member 51 integrally connected with each other with or without use of the adhesive so as to provide the required rigidity and vibration absorption characteristics. Accordingly, the tube fitting 10 of the present invention is capable of maintaining the required pressure resistance and connection strength, and effectively decreasing vibration and shock applied to the connected object during it is used. When it is applied to an air tool and the like, the handing and the workability of the air tool are significantly improved.

Modifications of the First Embodiment

Figure 4:
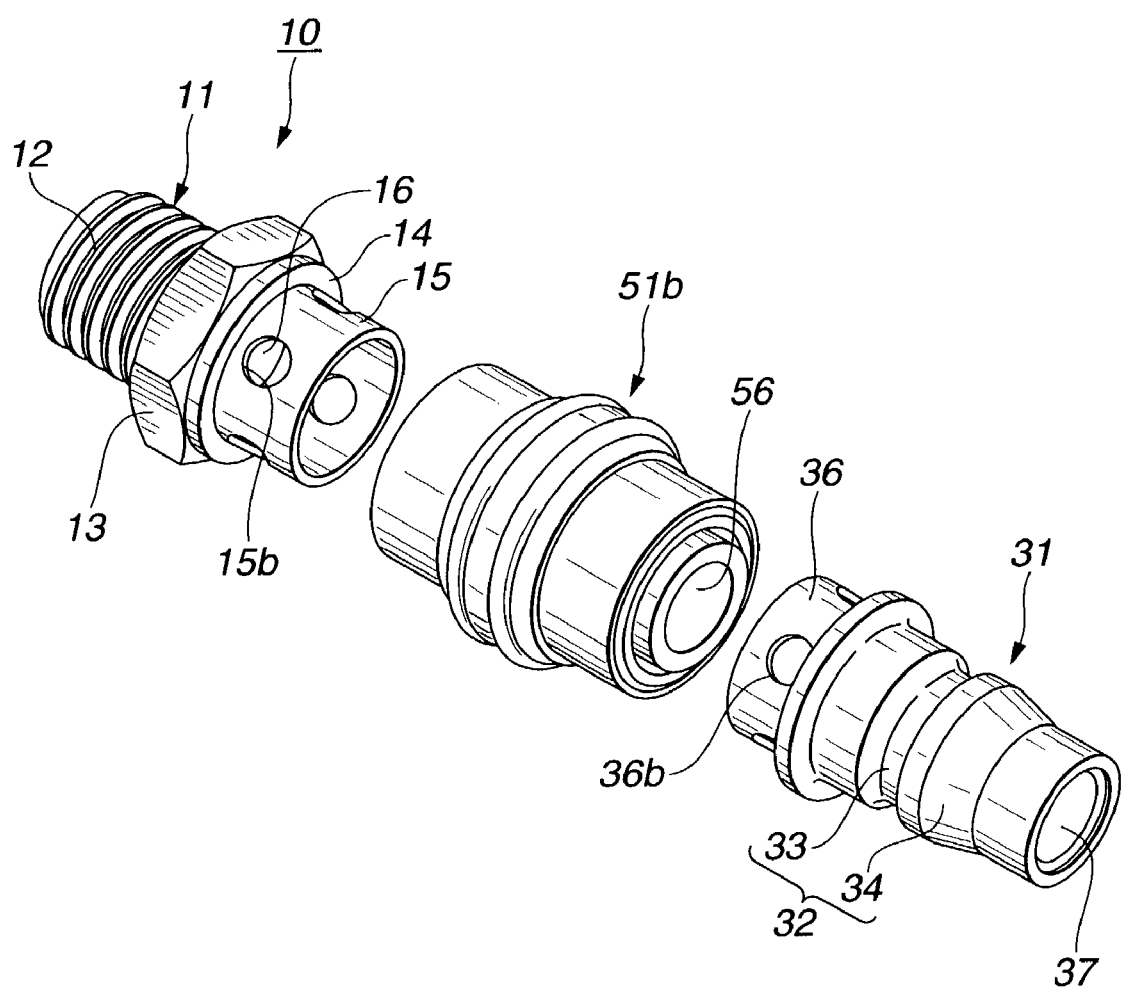
FIG. 4 is an exploded perspective view schematically showing the tube fitting shown in FIG. 3.
Figure 5A:
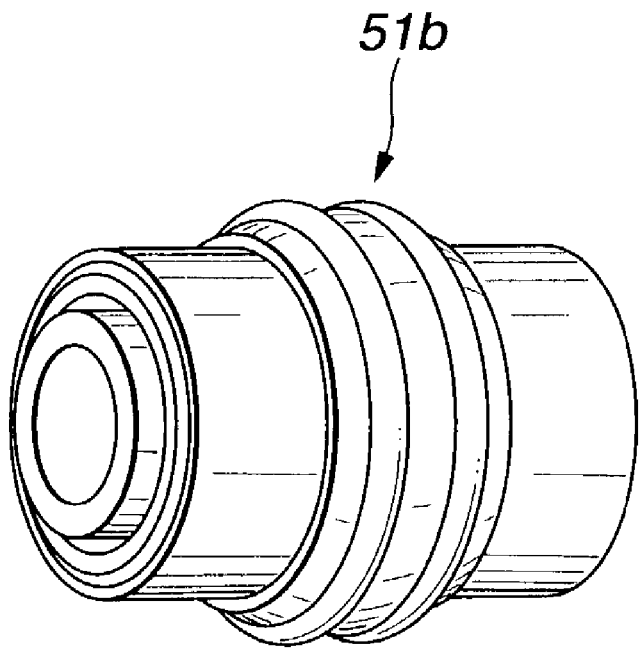
FIG. 5A is a perspective view and FIG. 5B is a sectional view the intermediate connection member.
Figure 5B:
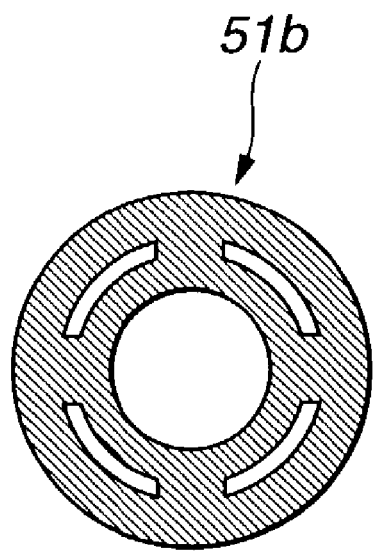

FIGS. 3 and 4 schematically show a tube fitting according to a modification of the first embodiment. FIG. 3A is a partially sectional side view. FIG. 3B is a longitudinal sectional view. FIG. 3C is a cross sectional view taken along the line III—III of the intermediate connection member shown in FIG. 3B. FIG. 4 is an exploded perspective view. FIG. 5 shows the intermediate connection member extracted from the tube fitting. FIG. 5A is a perspective view. FIG. 5B is a sectional view of the intermediate connection member shown in FIG. 5A.

As explained hereinabove, in the tube fitting according to the first embodiment of the present invention, the projections 15a and 36a are formed circumferentially on the annular collars 15 and 36 projecting from the end faces 14 and 35 of the connection head 11 and the connection nipple 31 so that the collars 15 and 36 can be fitted to channels of the intermediate connection member. Instead of forming the projections 15a and 36a on the circumferential surface of the annular collars 15 and 36, the tube fitting 10 according to the modification of the first embodiment is provided with through-holes each having a predetermined inside diameter arranged at a predetermined angular interval circumferentially on the annular collars 15 and 36. In this embodiment, four through-holes 15b and 36b are formed on the annular collars 15 and 36 radially at a 90-degree angular interval. The intermediate connection member 51b is formed by molding between the thread head 11 and the nipple 31 having the through-holes 15b and 36b on the collars 15 and 36. The reference numeral 56b represents the internal flow path.

According to the modification of the first embodiment, the intermediate connection member 51b is integrally molded between the end faces 14 and 35 of the thread head 11 and the nipple 31 and is not an independent coupling unit to fix as shown in FIGS. 1 and 2. The coupling is made by means of the inner resin molding. It is obvious that the use of the adhesive is also effective to form the intermediate connection member 51b by molding. The intermediate connection member 51b molded between the connection head 11 and the connection nipple 31 having the through-holes 15b and 36b on the annular collars 15 and 36 makes it possible to connect the connection head 11 and the connection nipple firmly as compared with the first embodiment.

Second Embodiment

Figure 6A:
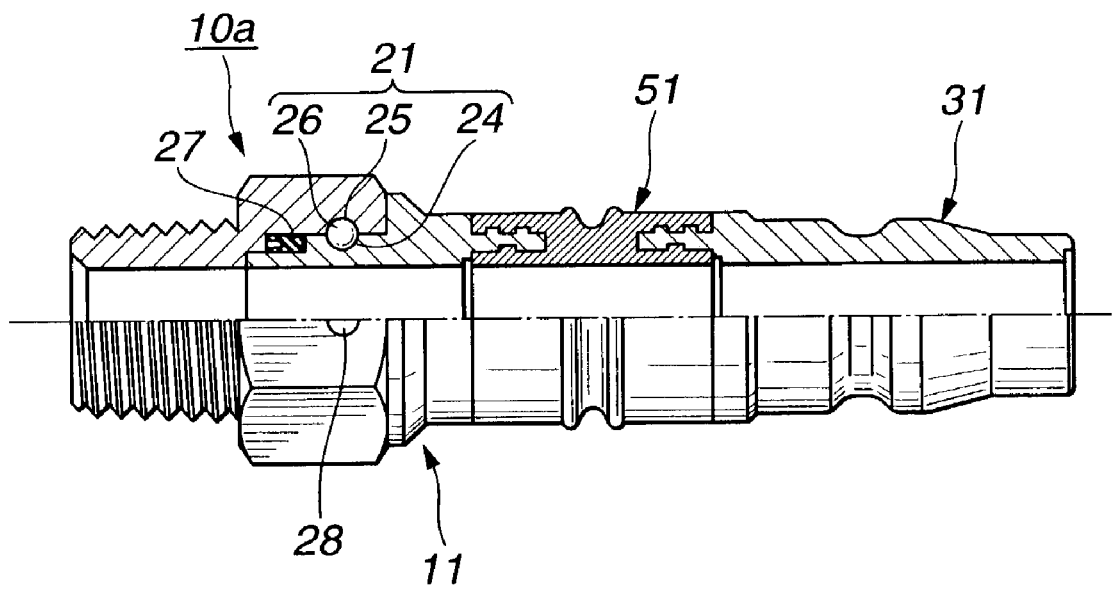
FIG. 6A is a partially sectional side view and FIG. 6B is a longitudinal sectional view.
Figure 6B:
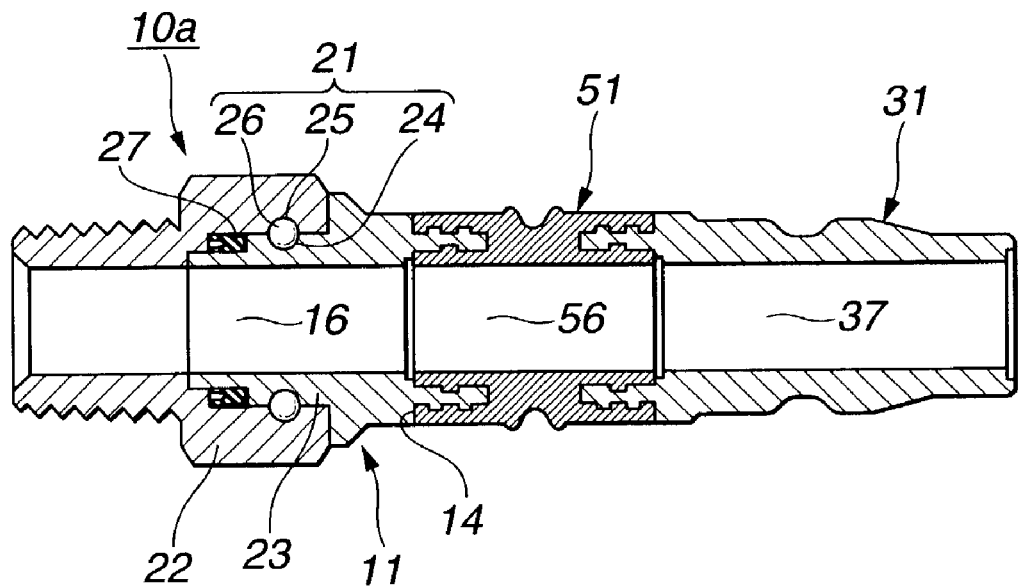

FIG. 6 schematically shows a tube fitting according to a second embodiment of the present invention. FIG. 6A is a partially sectional side view. FIG. 6B is a longitudinal sectional view.

The tube fitting 10a according to the second embodiment is to provide an axially rotatable connection head 21 instead of the connection head 11 of the tube fitting 10 of the first embodiment.

In FIG. 6, the connection head 11 comprises a stationary head 23 and a rotatable head 22. The stationary head 23 is connected to the intermediate connection member by inserting the annular collar into the groove of the intermediate connection member, and the rotatable head 22 is mounted on the stationary head 23. In order to rotate the head 22, a predetermined number of ball bearings 26 are arranged in a hemispheric annular channels 24 and 25 formed on the inner and outer surfaces of the stationary and rotatable head 23 and 22. Further, a Y-shaped seal ring 27 is provided for preventing the pressurized fluid from leaking.

The tube fitting 10a according to the second embodiment of the present invention provides the operations and working effects similar to that of the tube fitting 10 according to the first embodiment of the present invention. The tube fitting 10a is also advantageous for effectively removing a twist or the like applied to the tube fitting during use by the provision of the stationary and the rotatable heads 23 and 22.

Third Embodiment

Figure 7A:
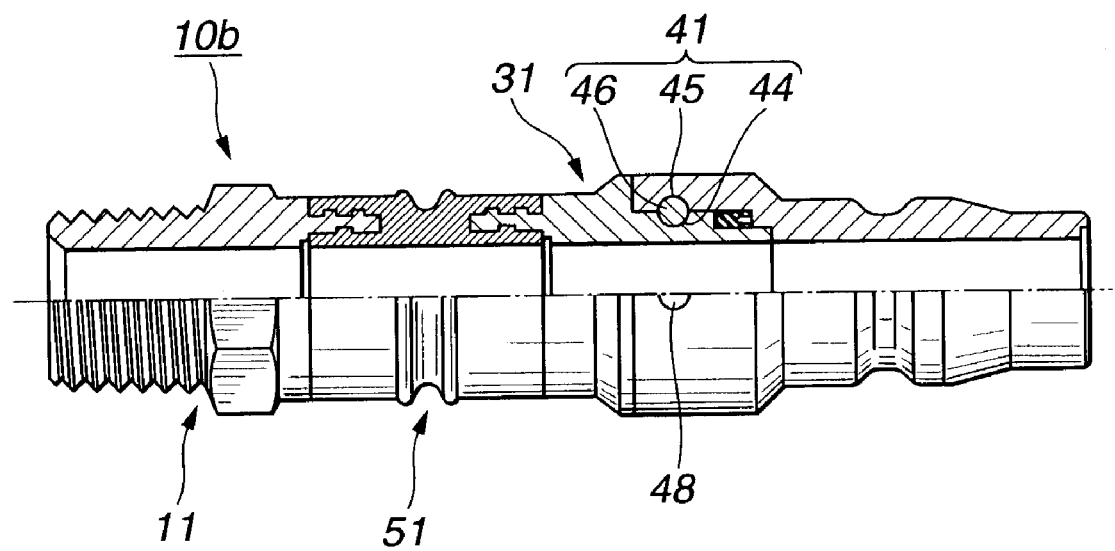
FIG. 7A is a partially sectional side view and FIG. 7B is a longitudinal sectional view.
Figure 7B:
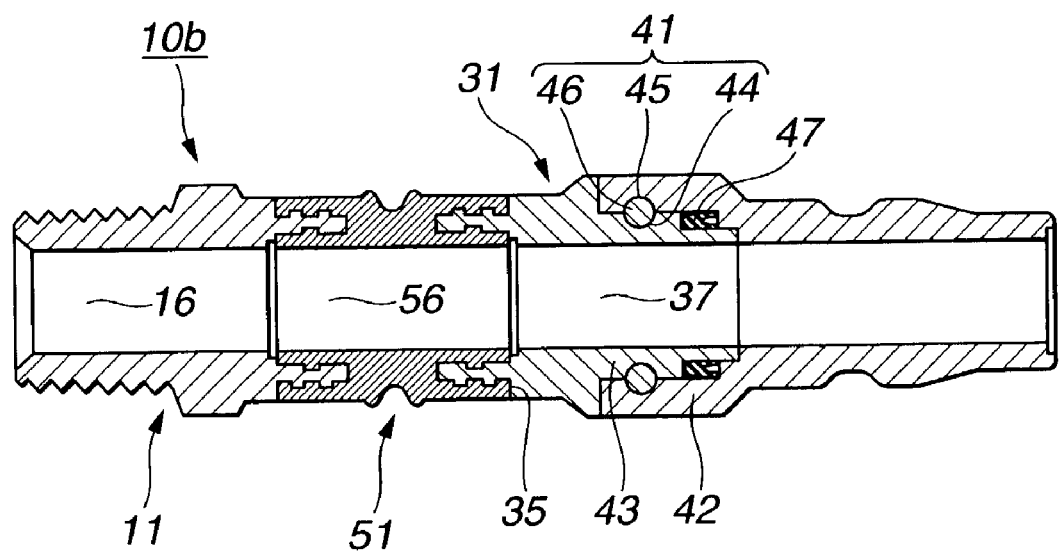

FIG. 7 schematically shows a tube fitting according to a third embodiment of the present invention. FIG. 7A is a partially sectional side view. FIG. 7B is a longitudinal sectional view.

The tube fitting 10b according to the third embodiment is to provide an axially rotatable connection nipple 41 instead of the connection nipple 31 of the tube fitting 10 of the first embodiment.

The tube fitting 10b according to the third embodiment shown in FIG. 7 is almost the same structure as that of the tube fitting 10a of the second embodiment. In FIG. 7, the connection nipple 31 comprises a stationary nipple 43 and a rotatable nipple 42. The stationary nipple is connected to the intermediate connection member 51 by inserting the annular collar into the annular groove of the intermediate connection member, and the rotatable connection nipple 42 is mounted on the stationary nipple 43. In order to rotate nipple 42, a predetermined number of ball bearings 46 are arranged in a hemispheric annular channel 44 and 45 formed on the inner and outer surfaces of the stationary and rotatable nipples 43 and 42. Further, a Y-shaped seal ring 47 is provided for preventing the pressurized fluid from leaking.

The tube fitting 10b according to the third embodiment of the present invention provides the operations and working effects similar to that of the tube fitting 10 according to the first embodiment of the present invention. The tube fitting 10b is also advantageous for effectively removing a twist or the like applied to the tube fitting during use by the provision of the stationary and rotatable nipples 43 and 42.

Figure 8:
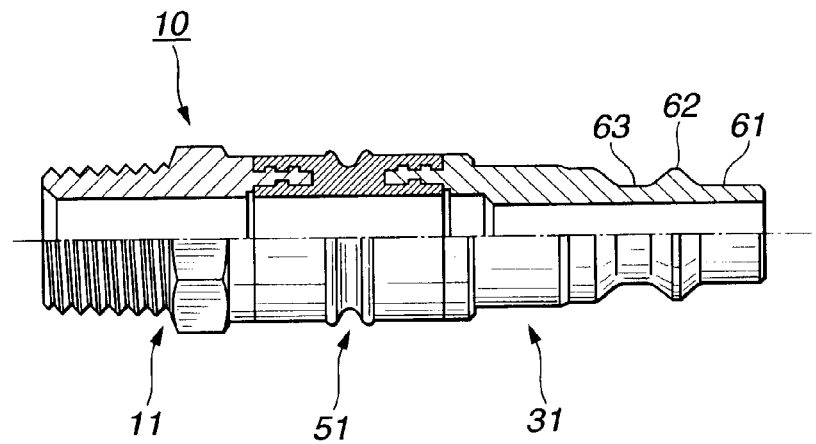
FIG. 8 is a partially sectional side view showing a first modification of a nipple of the tube fitting according to the first embodiment of the present invention shown in FIG. 3.
Figure 9:
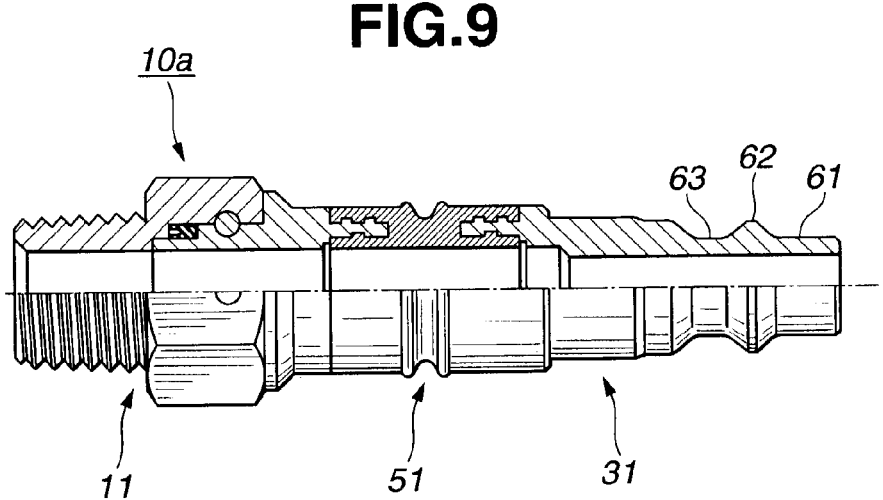
FIG. 9 is a partially sectional side view showing a first modification of a nipple of the tube fitting according to the second embodiment of the present invention shown in FIG. 6.
Figure 10:
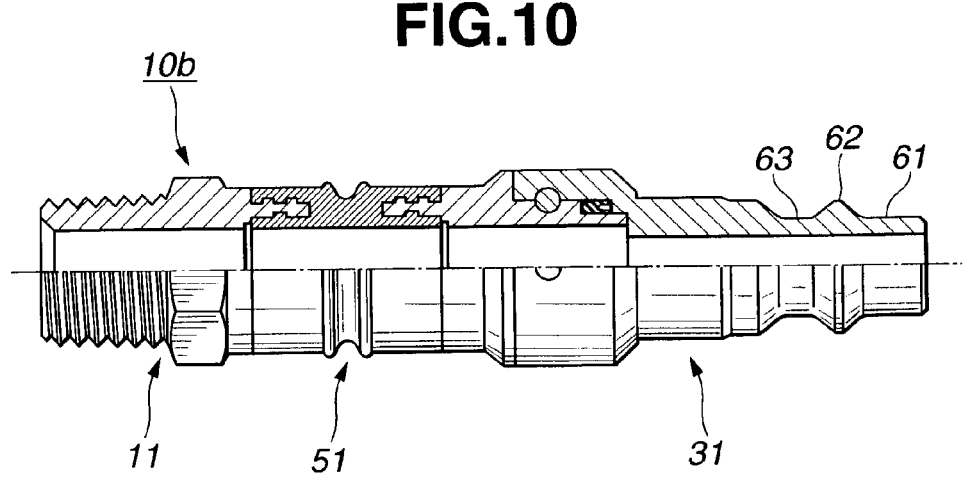
FIG. 10 is a partially sectional side view showing a first modification of a nipple of the tube fitting according to the third embodiment of the present invention shown in FIG. 7.

First Modification of the Connection Nipple According to the First, Second, and Third Embodiments FIGS. 8 to 10 are partially sectional side views showing a first modification of the connection nipple 31 of the tube fitting according to the first to third embodiments of the present invention.

FIGS. 8 to 10 show the tube fittings 10, 10a, and 10b having the modified form of the nipple 31, respectively. The nipples shown in FIGS. 8 to 10 are characterized to have the outer peripheral surface which is capable of connecting and disconnecting the nipple to and from a tube coupler. As shown in FIGS. 8 to 10, the connection nipple 31 includes a front guide 61 having a smaller diameter corresponding to a connecting bore of the tube coupler, a protuberance 62 bulging from the middle of the connection nipple 31, and a concaved annular groove 63.

The nipple 31 shown in FIGS. 8 to 10 has the outer surface which is a modified outer surface of the nipples of the first to third embodiments. Accordingly, the modification exhibits the same the function and advantage as that of the tube fittings 10, 10a, and 10b of the first to third embodiments.

Figure 11:
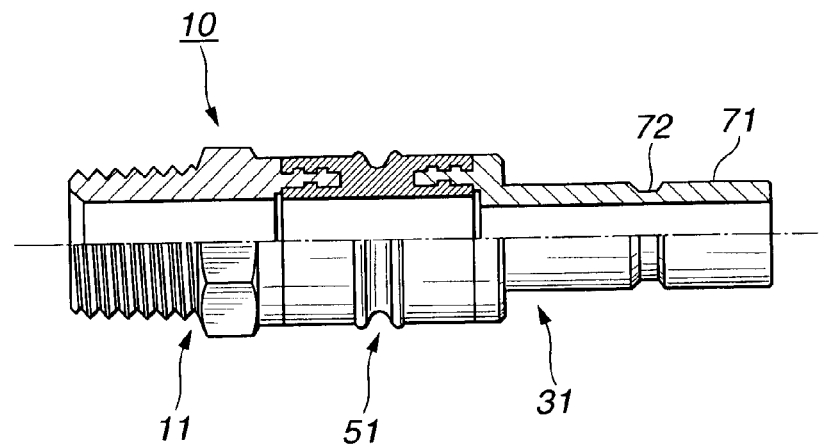
FIG. 11 is a partially sectional side view showing a second modification of a nipple of the tube fitting according to the first embodiment of the present invention shown in FIG. 3.
Figure 12:
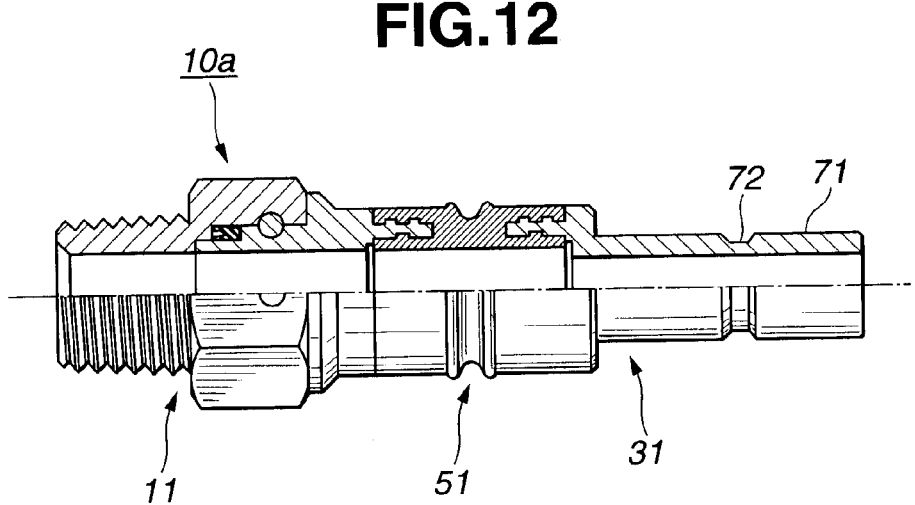
FIG. 12 is a partially sectional side view showing a second modification of a nipple of the tube fitting according to the second embodiment of the present invention shown in FIG. 6.
Figure 13:
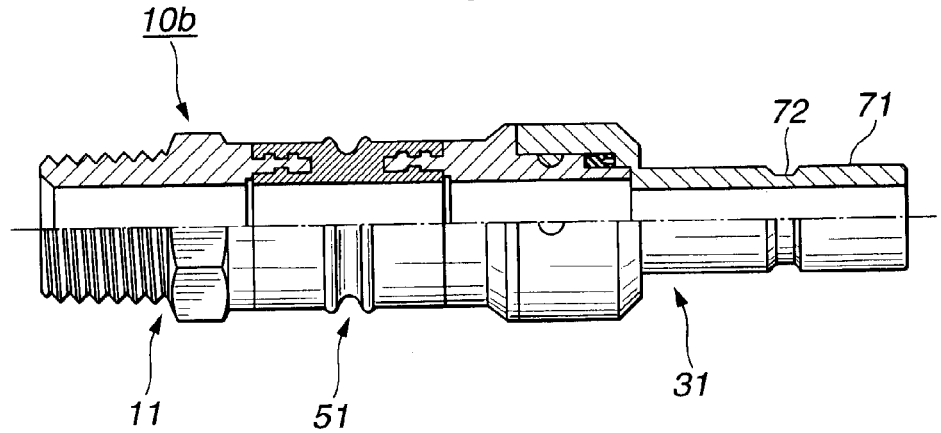
FIG. 13 is a partially sectional side view showing a second modification of a nipple of the tube fitting according to the third embodiment of the present invention shown in FIG. 7.

Second Modification of the Connection Nipple According to the First, Second, and Third Embodiments FIGS. 11 to 13 are partially sectional side views showing a second modification of the connection nipple 31 of the tube fitting according to the first to third embodiments of the present invention.

FIGS. 11 to 13 show the tube fittings 10, 10a, and 10b having the modified form of the connection nipple 31, respectively. Similar to the first modification, the connection nipples shown in FIGS. 11 to 13 are characterized to have the outer peripheral surface which is capable of connecting and disconnecting the connection nipple to and from a tube coupler. As shown in FIGS. 11 to 13, the connection nipple 31 includes a front grid 71 having a smaller diameter corresponding to a connection bore of the tube coupler, and an annular groove 72 concaved in the middle of the connection nipple 31.

Similar to the first modification, the connection nipples 31 shown in FIGS. 11 to 13 include a modified outer surface. Accordingly, the modification exhibits the same function and advantage as that of the tube fittings 10, 10a, and 10b of the first to third embodiments.

Figure 14A:
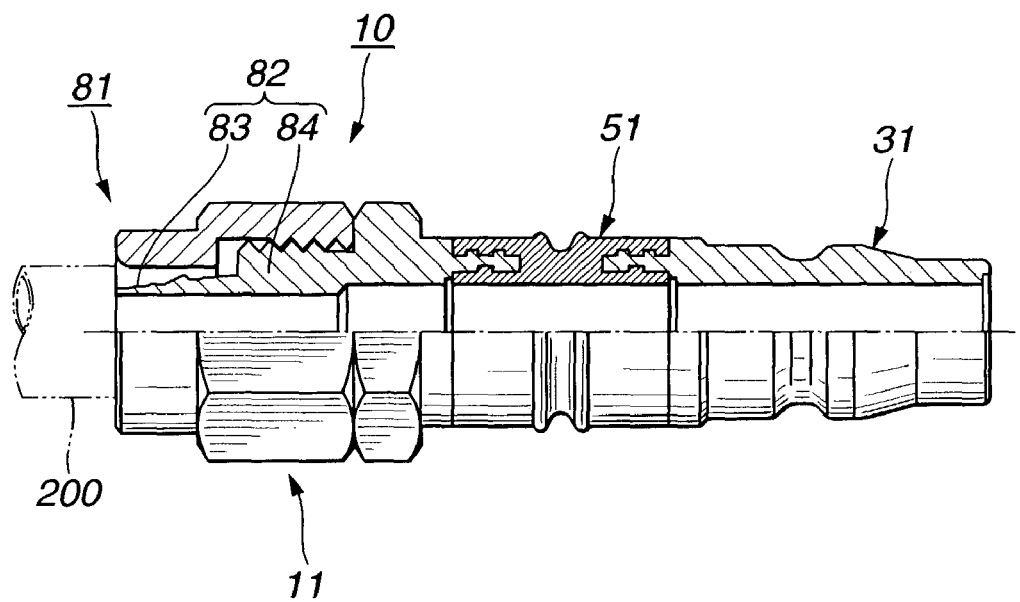
FIG. 14A is a partially sectional side view and FIG. 14B is a longitudinal sectional view.
Figure 14B:
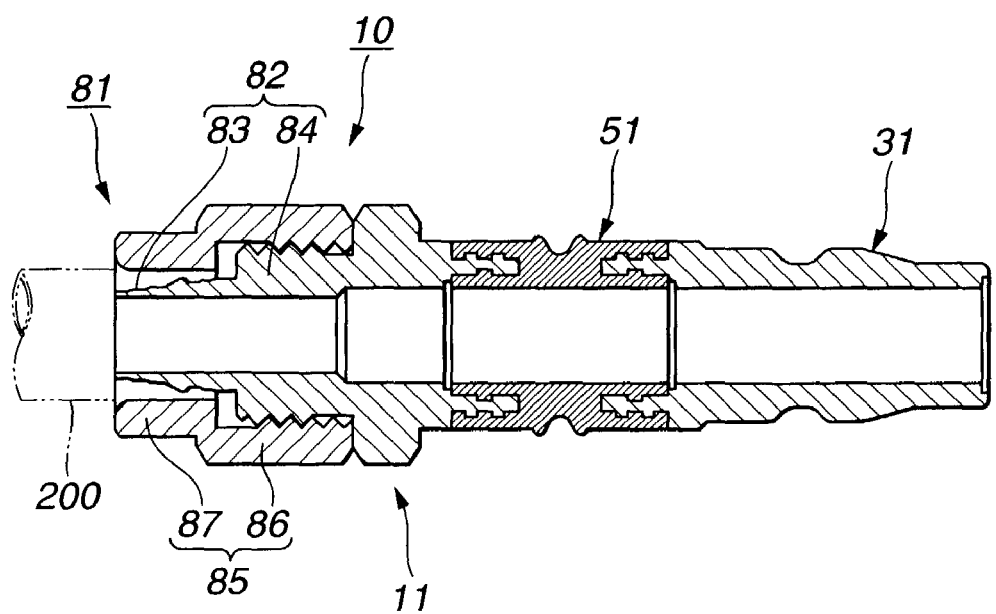
Figure 15A:
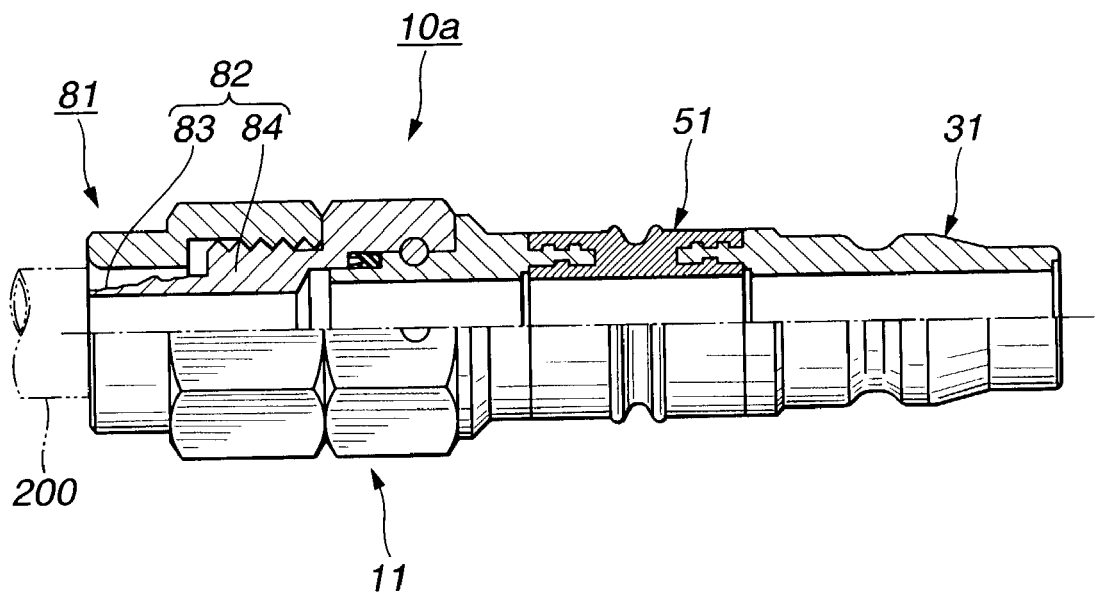
FIG. 15A is a partially sectional side view and FIG. 15B is a longitudinal sectional view.
Figure 15B:
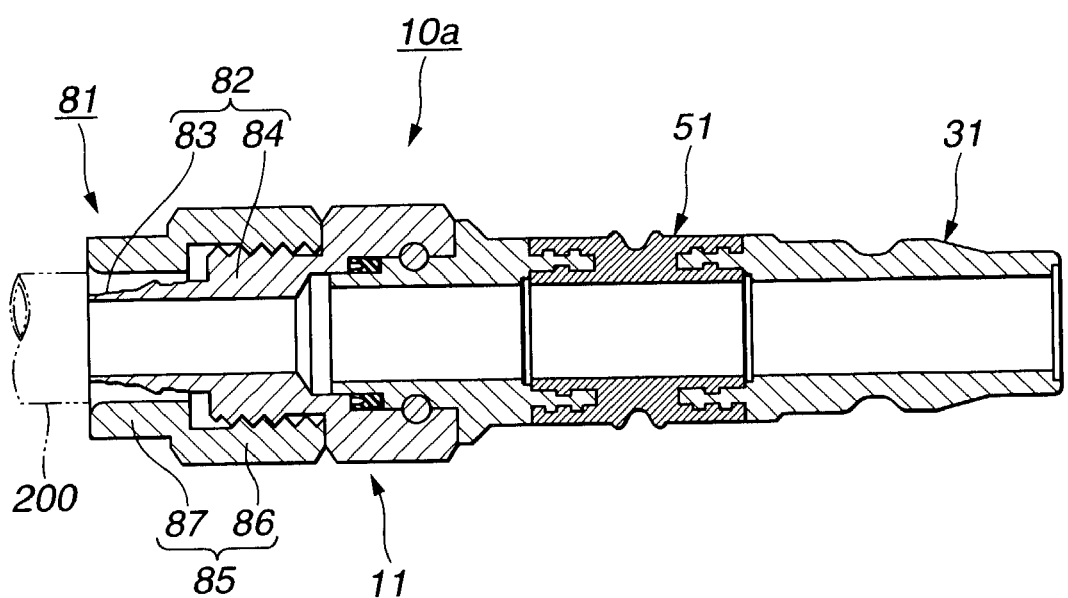
Figure 16A:
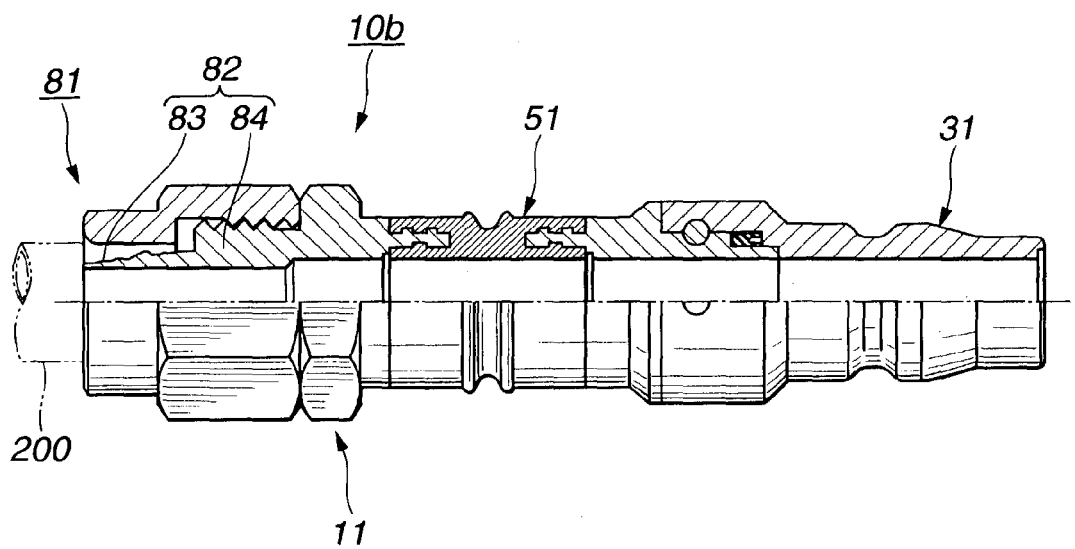
FIG. 16A is a partially sectional side view and FIG. 16B is a longitudinal sectional view.
Figure 16B:
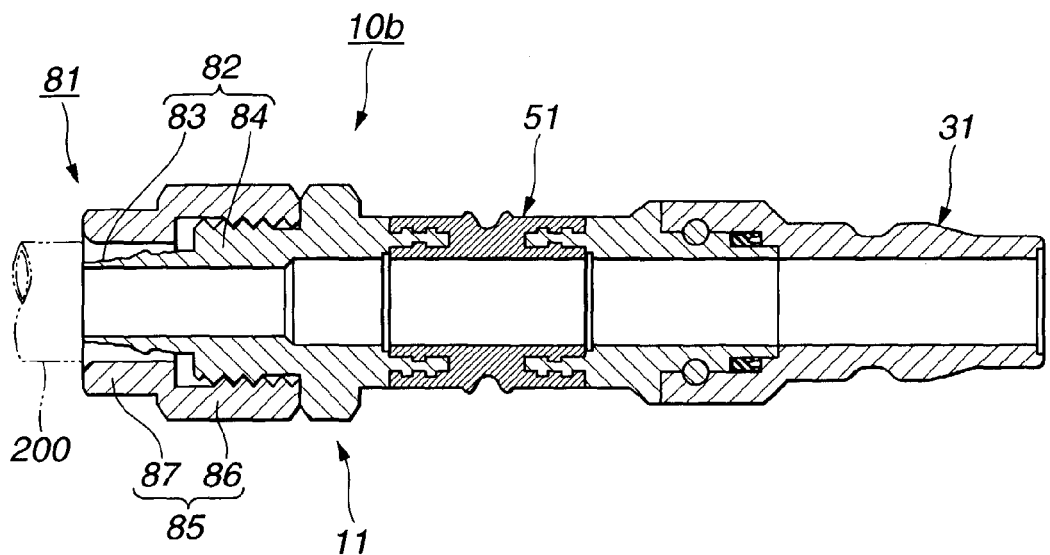

First Modification of the Connection Head According to the First, Second, and Third Embodiments FIGS. 14 to 16 show a first modification of the connection head of the tube fitting according to the first to third embodiments of the present invention. In figures, FIGS. 14A to 16A are partially sectional side views. FIGS. 14B through 16B are longitudinal sectional views.

FIGS. 14 to 16 show the tube fittings 10, 10a, and 10b having the modified form of the connection head 11, respectively. The tube fittings 10, 10a, and 10b shown in FIGS. 14 to 16 are provided with a connection head 81 which is capable of tightly fastening to a connecting end of a tube or hose 200 to be connected to the tube fitting 10 instead of the connection head 11 used in the first to third embodiments.

The connection head 81 shown in FIGS. 14 to 16 includes a connection plug 82 having a tapered connection end 83 and a male thread portion 84 adapted to be inserted into the end of the tube or hose 200, and a fastening nut 85 having a female thread portion 86 threadably engaging the male thread portion 84 of the connection plug 82 and a holding portion 87 of the tube or hose 200 inserted into the tapered connection end 83 of the plug 82 by the fastening nut 85. When the connection plug 82 is inserted into the tube or hose 200 and the fastening nut is threadably engaging the connection plug 82, the tube or hose 200 is tightly held between the holding portion 87 of the fastening nut and the tapered connection end 83 of the plug 82.

According to the first modification of the connection head 11 shown in FIGS. 14 to 16, there is shown the tube fittings 10, 10a, and 10b having the connection head for firmly connecting the tube or hose 200 thereto, and the intermediate connection member 51 and the connection nipple 31 remain the same as the embodiments shown in FIGS. 1–13. Accordingly, the modification shown in FIGS. 14 to 16 exhibits the same function and advantages as the tube fittings according to the first to third embodiments.

Figure 17A:
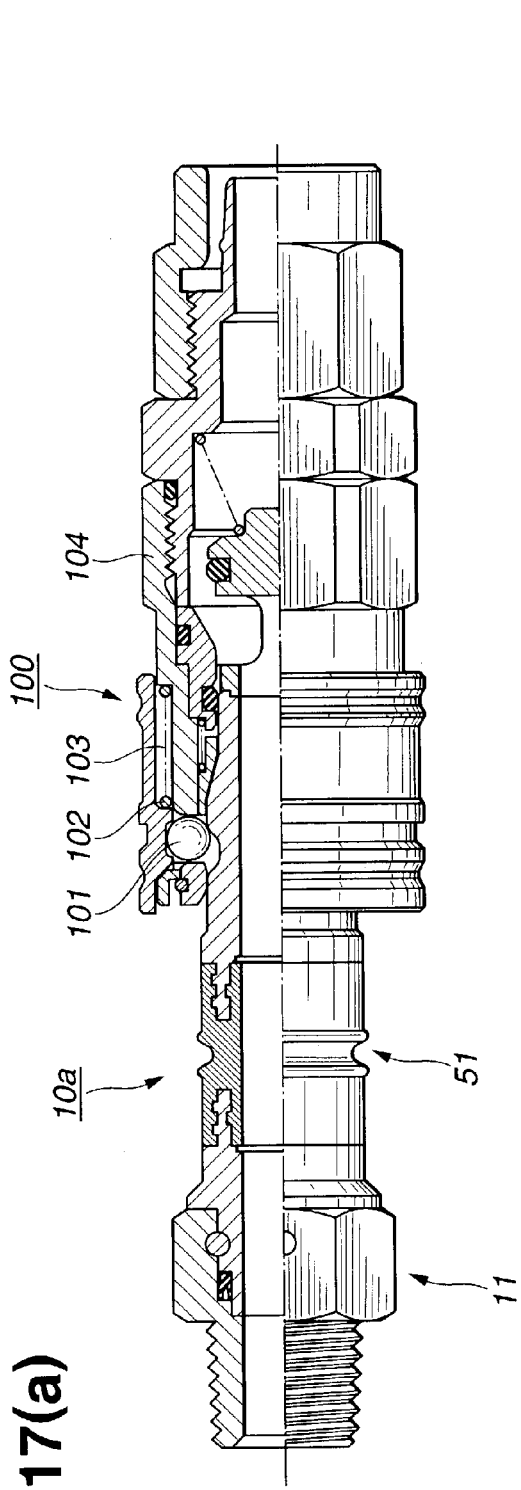
FIG. 17A is a partially sectional side view showing the connected state and FIG. 17B is a partially sectional side view showing the disconnected state.
Figure 17B:
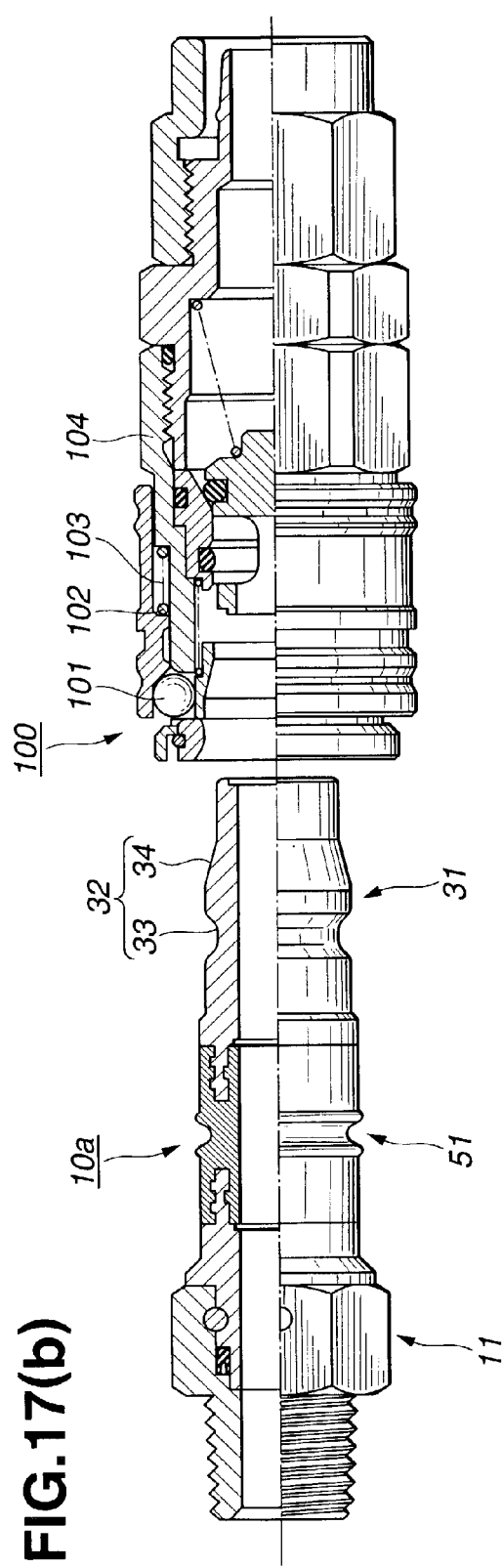

Example of Connecting and Disconnecting a Plug-in Quick Coupler to and from the Tube Fitting According to the Second Embodiment FIG. 17 shows a plug-in quick coupler to be connected and disconnected to and from the tube fitting according to the second embodiment of the present invention. FIG. 17A is a partially sectional side view showing the connected state. FIG. 17B is a partially sectional side view showing the disconnected state. More specifically, FIG. 17 shows the plug-in quick coupler 100 connected to or disconnected from a connecting portion 32 of the tube fitting 10a of the second embodiment. The plug-in quick coupler 100 is well known in the art. Accordingly, the detailed description of the plug-in quick coupler is omitted, and the explanation is directed to the connecting portion 32 of the connection nipple 31 which includes a connection guide cam face 34 and the anchor groove 33.

In FIG. 17, the reference numeral 101 represents an engaging ball to have the plug-in quick coupler connected to the tube fitting. The engaging ball 101 is restrained by an operation ring 102 that is biased by a spring 103. When the plug-in quick coupler is disconnected, the engaging ball 101 lies in a position restrained by the operation ring 102 and excluded outside the operation ring 102 in a retainer 104. When the nipple 31 is inserted, the connection guide cam face 34 is acted on the engaging ball 101 against the bias of the spring 103. When the plug is fully inserted, the engaging ball 101 is pushed into the anchor groove 34 so as to connect the nipple 31 to the plug-in quick coupler 100. The nipple 31 connected to the plug-in quick coupler 100 can be disconnected by actuating the operation ring 102 and releasing the engagement of the ball from the connecting portion 32 of the nipple 31.

According to the tube fitting of the present invention, the connection head and the nipple are connected by the intermediate connection member having required rigidity and vibration absorption characteristics. Accordingly, the tube fitting is excellent in toughness and vibration absorption characteristics, and is advantageous for satisfactorily and effectively absorbing and removing or drastically decreasing vibration transmitted to the tube fitting during use. In addition, these advantages and effects are attained by the tube fitting with the very simple structure.

Obviously, many modifications and variations of the present invention are possible in the light of the above teachings. It is therefore to be understood that within the scope of the appended claims, the invention may be practiced otherwise than as specifically described.

What is claimed is:

1. A tube fitting comprising:
   a connection head having a thread portion adapted for thread connection to an object to be connected at one end, an annular collar projecting axially from a surface of another end of said connection head, and a first axial flow passage;
   a connection nipple having a connection portion adapted for plug-in connection to a pressurized fluid source at one end, an annular collar projecting axially from a surface of another end of said connection nipple toward said connection head, and a second axial flow passage; and
   an intermediate connection member having a third axial flow passage for communicating with said first and second axial flow passages, said intermediate connection member having a predetermined hardness and vibration absorption characteristics and being arranged between said connection head and said connection nipple to be held by said annular collars projecting axially from said end surfaces of said connection head and said connection nipple, and inserted into said intermediate connection member,
   wherein each of said annular collars projecting from each end surface of said connection head and connection nipple is provided with a protrusion around the circumferential surface thereof and said intermediate connection member is provided with channels corresponding to each of said protrusions for permitting said protrusions to press to fit in said channels so as to join said connection head, said connection nipple and said intermediate connection member.

2. A tube fitting as defined in claim 1, wherein said intermediate connection member is provided with annular grooves corresponding to each of said annular collars projecting from each end surface of said connection head and said connection nipple on both side ends thereof for permitting said annular collars to engage said annular grooves so as to join said connection head, said connection nipple and said intermediate connection member.

3. A tube fitting as defined in claim 1, wherein said annular collars projecting from each end surface of said connection head and said connection nipple are held by said intermediate connection member made of a resin integrally molded on said annular collars.

4. A tube fitting as defined in claim 2, wherein said annular collars are held in said annular groove by an adhesive.

5. A tube fitting as defined in claim 3, wherein said annular collars are provided with through-holes around the circumference thereof at a predetermined interval.

6. A tube fitting as defined in claim 1, wherein said connection head and said connection nipples are made of a metal, and said intermediate connection member is made of a resin.

7. A tube fitting as defined in claim 1, wherein said connection head is rotatable.

8. A tube fitting as defined in claim 1, wherein said connection nipple is rotatable.

* * * * *